Figure 3:
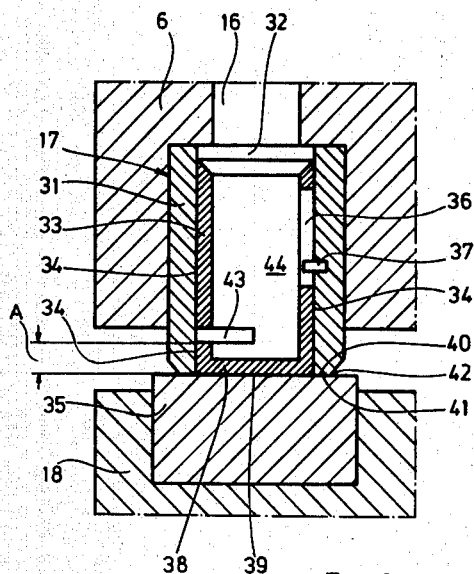

United States Patent [19]

Bodelson

[11] 4,375,870
[45] Mar. 8, 1983

[54] CENTRIFUGAL SEPARATOR WITH VALVED OUTLETS

[75] Inventor: Berth I. A. Bodelson, Tullinge, Sweden

[73] Assignee: Alfa-Laval AB, Tumba, Sweden

[21] Appl. No.: 237,431

[22] Filed: Feb. 23, 1981

[30] Foreign Application Priority Data

Feb. 28, 1980 [SE] Sweden .................. 8001551

[51] Int. Cl.³ .............................. B04B 11/04
[52] U.S. Cl. .................. 494/40; 251/343; 251/325; 494/26
[58] Field of Search .......... 233/19 R, 19 A, 20 R, 233/20 A, 27, 46, 47 R, 47 A; 251/325, 343, 344, 349

[56] References Cited

U.S. PATENT DOCUMENTS

| | | | |
|---|---|---|---|
| 2,911,139 | 11/1959 | Johnson | 233/47 R |
| 3,309,016 | 3/1967 | O'Brien | 233/20 R |
| 4,077,564 | 3/1978 | Thylefors | 233/20 A |
| 4,231,547 | 11/1980 | Manfroni | 251/325 X |

FOREIGN PATENT DOCUMENTS

| | | | |
|---|---|---|---|
| 50345 | 7/1919 | Denmark | 251/325 |
| 4636950 | 2/1968 | Japan | 233/20 R |

Primary Examiner—Philip R. Coe
Assistant Examiner—Joseph M. Pitko
Attorney, Agent, or Firm—Cyrus S. Hapgood

[57] ABSTRACT

The rotor of a centrifugal separator has at its periphery a plurality of valves for discharging medium from the interior of the rotor, which interior communicates with the valves through channels. Each valve is opened by a slot through a sleeve-formed section of a first part being uncovered by an edge of a second part of the valve. When the valve is closed, it is kept tight by said edge being pressed against an abutment surface of a seat.

9 Claims, 6 Drawing Figures

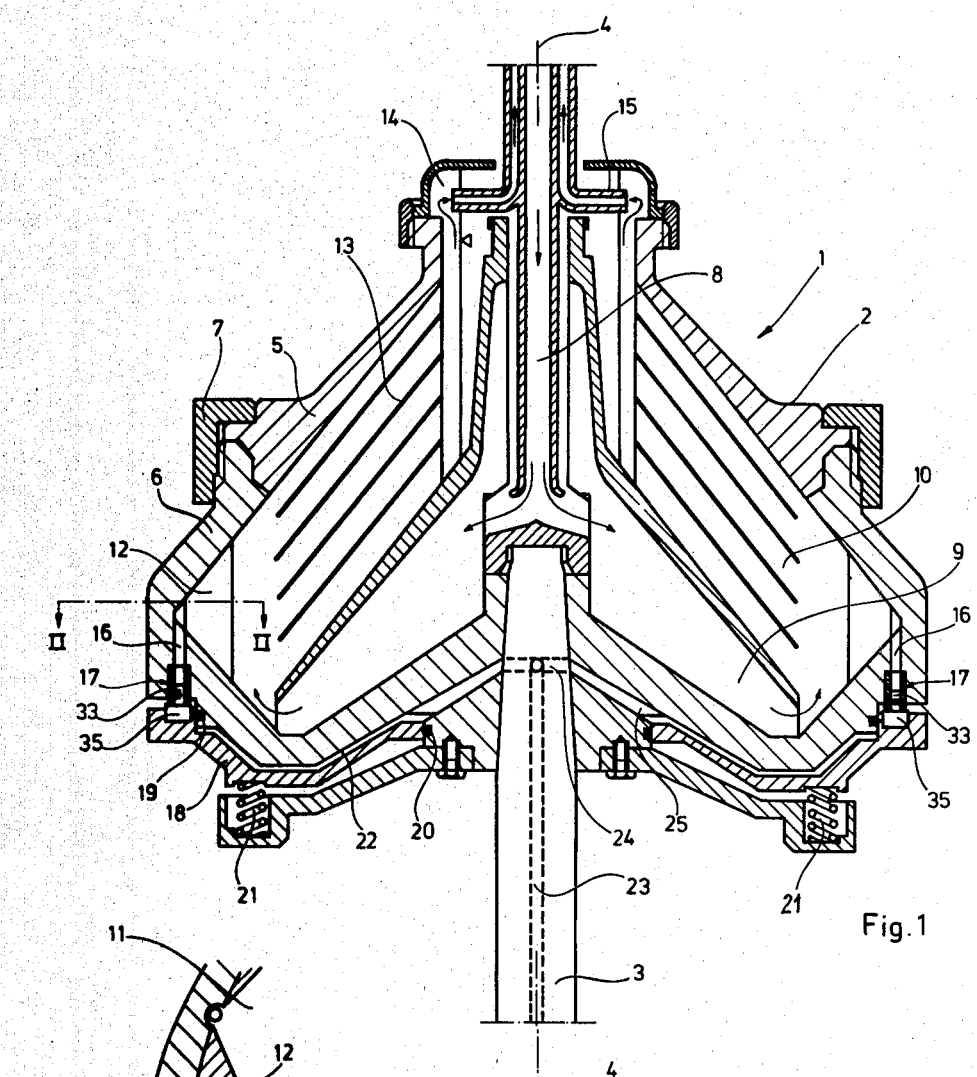
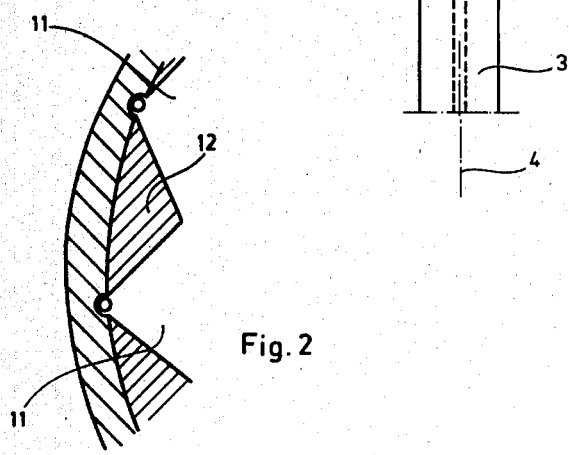

CENTRIFUGAL SEPARATOR WITH VALVED OUTLETS

This invention relates to a centrifugal separator comprising a rotor having at its periphery a plurality of valves which, during operation of the separator, can be opened to discharge medium from the separating chamber of the rotor, each valve being opened by a part of the valve being moved in the direction of the rotor's axis.

A centrifugal separator with such valves is known in the art, as through British Pat. No. 1,514,072. Each valve has a channel which communicates with the separating chamber. The respective channel ends in an orifice in a relatively hard and erosion-resistant material, which orifice is located in a plane perpendicular to the axis of the rotor. The valve also has a valve seat of a relatively soft and erosion-sensitive material, which valve seat is displaceable in the axial direction of the rotor towards and away from the orifice between a first position, where the seat abuts the orifice, the valve thereby being closed, and a second position where the seat is spaced from the orifice, the valve thereby being fully open. The valve seat is made of a relatively soft material in order that it shall contact around the whole orifice even if the seat should be positioned somewhat obliquely in relation to the orifice, as due to deformation during operation of the means which holds the seat.

When the valve opens, the medium which leaves the channel will discharge under great pressure through the annular space which is then formed between the orifice and the valve seat. If the medium contains erosive particles, these will erode the valve seat during the entire time when the medium flows out through the valve. This erosion of the valve seat leads to the result that the valve cannot remain tight when it takes its closing position.

The problem to which the present invention is directed is to avoid the drawbacks noted above so that the valves remain tight when they take closing positions, even if an erosive medium flows through them when they are open.

This problem is solved by the separator according to the invention, in which each valve comprises an inner part and an outer part which are displaceable relative to each other in the axial direction of the rotor and have an inner space which is closed at one end and communicates with the separating chamber. A first of these parts has a sleeve-formed section of a relatively hard and erosion-resistant material, which section extends in the axial direction of the rotor and is provided with an opening covered by the other of said parts when the valve is closed. Said other part has an annular end edge of a relatively hard and erosion-resistant material and which, when the valve is closed, is kept pressed in the axial direction of the rotor against an annular abutment surface of a relatively soft material. This abutment surface then seals against the end edge and constitutes a sealing place which prevents the medium from forcing its way out of the valve. The end edge, by displacement of the parts relative to each other, is arranged to uncover the opening and establish a communication between the inner surface and ambient atmosphere, the opening being located at such a distance from the abutment surface that the abutment surface is freed from the medium which flows out through the opening when the opening is uncovered by the end edge.

In this way, the part of the valve which is the least resistant to erosion, namely the abutment surface with which the end edge forms a sealing place when the valve is closed, will not be exposed to the erosive action of the medium flowing out, whereby said sealing place remains intact and the valve remains tight after a greater number of emptyings through the valve than is possible with the valves of the known centrifugal separator.

It cannot be prevented that the medium which discharges through the valve will tend to erode the end edge when it uncovers the opening. This erosion is developed relatively slowly, as the end edge is of relatively hard and erosion-resistant material, and such erosion is therefore of less importance. However, in order to protect the end edge from the erosive action of the discharging medium, the opening is preferably arranged so that when the valve is wholly open the opening is located at such a distance from the end edge that the end edge is free from the medium which flows out through the opening.

According to a preferred form of the invention, the opening in the first part is constituted by a slot arranged at right angles to the axis of the rotor. In this way, an opening is obtained which requires only a small axial movement of the end edge relative to the opening to be opened. The opening can be directed so as to prevent the medium from flowing in the direction towards the machine and interfering with control means of the machine.

The first part may be constituted by a cup-formed element which is displaceable in the other part and at its bottom rests on a seat which has the annular abutment surface. In this way, a structurally simple valve construction is obtained, in which the abutment surface can be easily inspected and renewed. The abutment surface, during operation of the separator, is maintained securely in place by the end edge and the cup-formed element when the valve is closed and by the cup-formed element when the valve is open.

In still another form of the invention, the other part has means which prevent the cup-formed element from revolving in the other part. In this way, the means for guiding the cup-formed element is not located in the seat. Thus, there is freedom to design the seat so that by making the surface of the seat which is in contact with the cup-formed element plane, the seat can move in the radial direction without jeopardizing free displaceability of the cup-formed element in the axial direction.

Figure 4:
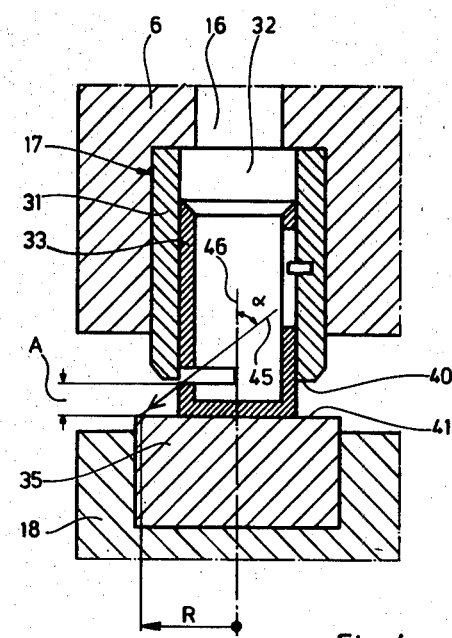
Figure 5:
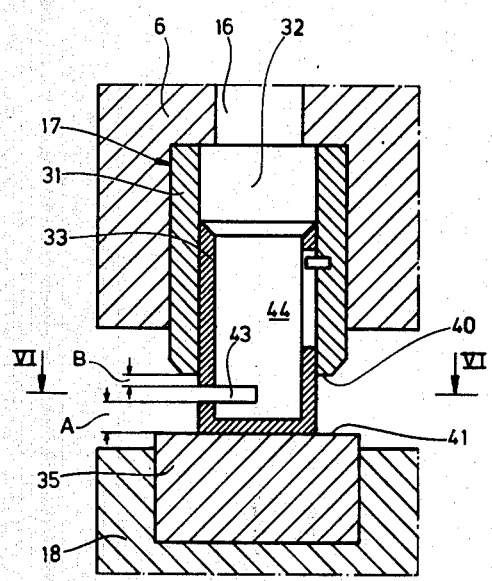
Figure 6:
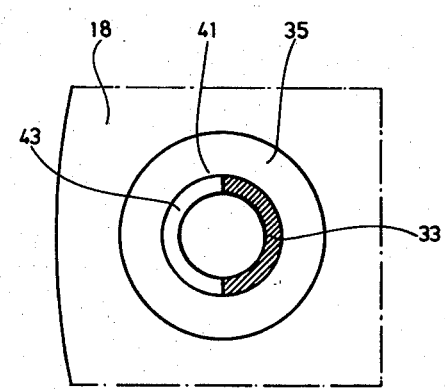

An embodiment of the invention is described below in connection with the attached drawings in which FIG. 1 is a longitudinal sectional view of the rotor of a centrifugal separator having a plurality of valves, FIG. 2 is a sectional view according to the marking II—II in FIG. 1 through a part of the separating chamber of the rotor, which separating chamber communicates with the valves, and FIGS. 3-6 show one of the valves in FIG. 1 enlarged, FIG. 3 showing the valve when it is closed, FIG. 4 showing the valve when it is being opened, FIG. 5 showing the valve when it is wholly open and FIG. 6 showing a sectional view of the valve according to the marking VI—VI in FIG. 5.

A centrifugal separator 1 comprises a rotor 2 which is mounted on a shaft 3 and is rotatable around the central axis 4 of the shaft. The rotor 2 comprises a cover 5 and a bowl-formed part 6, which are connected with each other by a ring 7 screwed onto part 6.

A mixture of a heavier and a lighter medium is supplied to the rotor through a stationary inlet channel 8, from where the mixture flows through a distribution channel 9 into the separating chamber 10 of the rotor. In chamber 10, centrifugal force causes the heavier medium to move outwards and settle in pockets 11 of the separating chamber, which pockets are formed by wedge-shaped filling pieces 12 at the periphery of the rotor. The lighter medium moves inwards between conical discs 13 to a chamber 14, where it is discharged by a stationary paring disc 15.

The bottoms of the pockets 11 communicate via axial channels 16 with valves 17 which can be opened to let out medium from the pockets 11. The valves 17 are evenly distributed along the circumference of the rotor and are operated simultaneously by a common control member or slide 18. The latter is displaceable in guides 19 and 20 in the direction of the rotor axis between two end positions. When the slide 18 is located in a first end position, which is its upper position closest to the bowl-formed part 6, it keeps the valve closed. When the slide 18 is located in the other end position (its lower position), the valves are kept open.

The slide 18 is kept in its first or upper end position by springs 21 and in its other end position by compressed air, which is introduced into a space 22 between the slide 18 and the bowl-formed part 6 via channels 23, 24 and 25 in the shaft 3 and in the bowl-formed part 6.

As shown in FIGS. 3-6, each valve 17 comprises a sleeve 31 of a relatively hard material mounted in the bowl-formed part 6 and having a channel 32 which constitutes an extension of the channel 16 in the bowl-formed part 6. A cylindrical cup-formed element 33 of a relatively hard material is displaceable vertically in the channel 32 and is guided by the channel 32 in the lateral direction, the space between the element 33 and the wall of the channel 32 constituting a sleeve-formed clearance space 34. The latter is of sufficient width to allow the vertical displacement of element 33 in the sleeve 31 but is narrow enough to prevent, as far as possible, the medium from forcing its way out through the clearance space.

The element 33, which the medium tends to press downward relative to the sleeve 31, rests on a seat 35 which is fixedly connected with the control slide 18. Element 33 is provided with a longitudinal slot 36 into which a pin 37 extends, the pin being connected with the sleeve 31, whereby rotation of the element 33 around its longitudinal axis is prevented. The element 33 rests with its bottom 38 on a plane surface 39 of the seat 35, so that the control slide 18 with the seat 35 can move in a radial direction relative to the element 33 without the seat 35 forcing the element 33 in a radial direction.

The sleeve 31 has an end edge 40 against which an abutment surface 41 of the seat 35 is kept pressed by the control slide 18 when the valve is closed (FIG. 3), so that the end edge 40 and the abutment surface 41 together form a sealing place 42 of the closed valve. In order that the sealing at the location 42 shall be as effective as possible, the seat 35 is made of a relatively soft material so that the abutment surface 41 is pressed in by the end edge 40 and conforms to the end edge when the valve is closed.

The element 33 is provided with a slot 43 extending at right angles to the axis of the element 33 through its sleeve-formed wall. The extension of the slot 43 circumferentially around the axis of the element 33 is about 180°. The edge 40 is displaced downward from the slot 43 by the distance A when the valve is closed (FIG. 3).

When the valve is closed, the medium in the interior 44 of the element 33 strives to force its way out of the valve but is prevented from doing so partly by the part of the sleeve-formed clearance space 34 which is marked by A and partly by the sealing place 42.

The valve is opened (FIG. 4) by movement of the control slide 18 and seat 35 downward in the direction away from the sleeve 31, the element 33, under the action of the pressure of the medium in the interior of element 33, following the seat 35. The slot 43 is thus uncovered by the edge 40 and the medium flows out through the slot.

The valve takes its fully open position (FIG. 5) when the slot 43 is located at a distance B below the edge 40, the medium flowing out through the slot 43 in substantially radial directions without impinging upon either the edge 40 or the abutment surface 41. The valve is closed again by the control slide 18, with the seat 35 and the element 33, being returned upwardly to the position shown in FIG. 3.

The seat 35, which is made of a relatively soft material, constitutes the part of the valve which has the poorest resistance to erosion. Therefore it is important that the abutment surface 41, which constitutes a sealing surface of the sealing place 42, be protected from the discharging medium.

The medium which flows out of the valve will not impinge upon the abutment surface 41 (i.e., the surface which is in sealing contact with the edge 40 when the valve is closed) if the distance A is sufficiently great. To explain this, it should be noted that when the edge 40 begins to uncover the slot 43 (FIG. 4), the medium begins to flow out through the slot in a direction 45 forming an angle $\alpha$ of about 45° with the axis 46 of the element 33. This medium hits the seat 35 along an arc of a circle which is located at the distance R from the axis 46 and which, by the distance A having been made sufficiently great, is located radially outside the abutment surface 41. On the continued uncovering of the slot 43, the angle $\alpha$ will increase and the medium will hit the seat 35 farther and farther away from the abutment surface 41 so that when the valve takes the position shown in FIG. 5, the medium finally discharges at substantially right angles to the axis 46.

The slot 43 does not have to be arranged in a cup-formed element which moves with the control slide 18. Within the scope of the invention, it is also possible to turn it the other way round, i.e., arrange the slot 43 in a sleeve-formed element which is fixed relative to the bowl-formed part 6 and let an annular end edge of a cup-formed element, which surrounds the sleeve-formed element with the slot and which moves with the control slide 18, carry out the same duties as the edge 40 described above.

I claim:

1. In combination with a centrifugal rotor mounted for rotation about an axis and having a separating chamber, a plurality of valves located at the outer periphery of the rotor and adapted to be opened during rotation of the rotor to discharge a separated medium from said chamber, each valve comprising a control member movable in the direction of said axis to open the valve, each valve also comprising an inner part and an outer part adapted for displacement relative to each other in the direction of the rotor axis and forming an inner space which is closed at one end and which communicates with the separating chamber, a first of said parts having a sleeve-shaped section of relatively hard and erosion-resistant material, said section extending in the axial direction of the rotor and having an opening for discharging medium from said space, said opening being covered by the other of said parts when the valve is closed, said other part having an annular end edge of relatively hard and erosion-resistant material, said control member having an annular abutment surface of relatively soft material which is pressed in the axial direction of the rotor against said end edge when the valve is closed, whereby said abutment surface seals against the end edge to form a sealing place which prevents said medium from forcing its way through the valve, said end edge being operable by said relative displacement of the inner and outer parts to uncover said opening and thereby establish a communication between said inner space and ambient atmosphere, said opening being spaced from said abutment surface by a distance sufficient to prevent said medium from impinging upon said surface while discharging through the opening when said opening is uncovered by said end edge.

2. The combination of claim 1, in which, when the valve is fully open, said opening is spaced from said end edge by a distance sufficient to prevent said discharging medium from impinging upon said end edge.

3. The combination of claim 1, in which said opening is a slot extending at right angles to the rotor axis.

4. The combination of claim 1, in which said first part is a cup-shaped element displaceable in said other part, said control member including a seat forming said annular abutment surface, said cup-shaped element having a bottom engaging said seat.

5. The combination of claim 4, in which said other part includes means preventing rotation of said cup-shaped element in said other part.

6. The combination of claim 4, in which said control member is a slide common to all of said valves and forming said seat of each valve, said slide being movable for simultaneous operation of all the valves.

7. The combination of claim 1, in which said annular end edge is located adjacent said closed end of said inner space when the valve is closed.

8. The combination of claim 7, in which said annular end edge surrounds said closed end of said inner space when the valve is closed.

9. The combination of claim 8, in which said first part is a cup-shaped element displaceable in said other part, said control member including a seat forming said annular abutment surface, said cup-shaped element having a bottom engaging said seat.

* * * * *